US012709664B2

(12) United States Patent
Borhan et al.

(10) Patent No.: US 12,709,664 B2
(45) Date of Patent: Aug. 18, 2026

(54) DEFOAMER

(71) Applicant: Petroliam Nasional Berhad (PETRONAS), Kuala Lumpur (MY)

(72) Inventors: Noorazlenawati Borhan, Kuala Lumpur (MY); Suzalina Zainal, Kuala Lumpur (MY); Khairulazhar Jumbri, Perak Darul Ridzuan (MY); Anita Ramli, Perak Darul Ridzuan (MY); Almila Hassan, Perak Darul Ridzuan (MY)

(73) Assignee: Petroliam Nasional Berhad (PETRONAS), Kuala Lumpur (MY)

( * ) Notice: Subject to any disclaimer, the term of this patent is extended or adjusted under 35 U.S.C. 154(b) by 584 days.

(21) Appl. No.: 18/025,865

(22) PCT Filed: Sep. 9, 2021

(86) PCT No.: PCT/MY2021/050073

§ 371 (c)(1),
(2) Date: Mar. 10, 2023

(87) PCT Pub. No.: WO2022/055343

PCT Pub. Date: Mar. 17, 2022

(65) Prior Publication Data

US 2023/0340207 A1 Oct. 26, 2023

(30) Foreign Application Priority Data

Sep. 11, 2020 (MY) .............................. 2020004727

(51) Int. Cl.
*C08G 77/26* (2006.01)
*C08K 5/544* (2006.01)

(52) U.S. Cl.
CPC .............. *C08G 77/26* (2013.01); *C08K 5/544* (2013.01)

(58) Field of Classification Search
CPC ...................................................... C08G 77/24
USPC ............................................ 556/425; 528/38
See application file for complete search history.

(56) References Cited

U.S. PATENT DOCUMENTS 3,146,250 A * 8/1964 Speier .................. C07F 7/0874 556/412
6,201,058 B1 * 3/2001 Mahr .................. C08G 77/388 528/33
2010/0068394 A1 3/2010 Hagemeister et al.
2018/0230401 A1 8/2018 Sakanishi
(Continued)

FOREIGN PATENT DOCUMENTS

CA 2702022 C 8/2009
CN 101100514 A 1/2008
EP 0355497 A2 2/1990
(Continued)

OTHER PUBLICATIONS

International Search Report and Written Opinion for Application No. PCT/MY2021/050073, mailed on Dec. 20, 2021, 7 pages.
(Continued)

*Primary Examiner* — Margaret G Moore
(74) *Attorney, Agent, or Firm* — Sheppard Mullin Richter & Hampton LLP

(57) ABSTRACT

Provided are defoamer compounds that have efficacy in the prevention of foam build-up and breakdown of built up foam in industrial processes.

10 Claims, 12 Drawing Sheets

(56) References Cited

U.S. PATENT DOCUMENTS

2019/0345346 A1 11/2019 Peskens et al.

FOREIGN PATENT DOCUMENTS

| | | | |
|---|---|---|---|
| EP | 0444920 | A2 | 9/1991 |
| EP | 0465262 | A2 | 1/1992 |
| EP | 0465263 | A2 | 1/1992 |
| EP | 0549343 | A1 | 6/1993 |
| EP | 0820481 | B1 | 12/1999 |
| JP | S61238792 | A | 10/1986 |
| JP | H1180169 | A | 3/1990 |
| JP | H02250887 | A | 10/1990 |
| JP | H06256521 | A | 9/1994 |
| JP | 07-244398 | A | 9/1995 |
| JP | 2000281792 | A | 10/2000 |
| JP | 2011057689 | A | 3/2011 |
| JP | 2011184652 | A | 9/2011 |
| JP | 2013-112776 | A | 6/2013 |
| JP | 2015206030 | A | 11/2015 |
| WO | 2019/063538 | A1 | 4/2019 |

OTHER PUBLICATIONS

Hassan et al., "Physio-Chemical Analysis of Amide and Amine Poly(dimethylsiloxane)-Modified Defoamer for Efficient Oil-Water Separation", ACS Omega, Jun. 2021, vol. 6, No. 23, pp. 14806-14818.

International Preliminary Report on Patentability for Application No. PCT/MY2021/050073, mailed on Mar. 23, 2023, 6 pages.

Search Report for Malaysian Application No. PI2020004727 dated Jan. 4, 2023, 4 pages.

Hassan et al., Physio-Chemical Analysis of Amide and Amine Poly(dimethylsiloxane)-Modified Defoamer for Efficient Oil-Water Separation, ACS Omega, 2021, 6 pp. 14806-14818, 13 pages.

European Extended Search Report dated Sep. 23, 2024, for European Patent No. 21867207.9, 6 pages.

* cited by examiner

DEFOAMER

CROSS-REFERENCE TO RELATED APPLICATIONS

This application is a National Phase Application of International Patent Application No. PCT/MY2021/050073, filed on Sep. 9, 2021, which claims priority to Malaysia Application No. PI2020004727 filed on Sep. 11, 2020, each of which is incorporated by reference in its entirety.

FIELD OF INVENTION

The present invention relates to a defoamer suitable for use in industrial processes that produce unwanted foam as a by-product, for example foam generated by the use of surfactants in processes such as foam assisted gas lift (FAGL) and enhanced water-alternating gas (EWAG) reactors.

BACKGROUND

The listing or discussion of a prior-published document in this specification should not necessarily be taken as an acknowledgement that the document is part of the state of the art or is common general knowledge.

Oil extraction from wells using foam assisted gas lift (FAGL) and enhanced water alternating gas (EWAG) processes involves the injection of a surfactant into the well, which generates large quantities of foam. This foam typically forms a persistent layer that does not rapidly dissipate or collapse. Thus, while foam generation is an essential element of extraction processes, the presence of foam is detrimental to further processing of the crude oil. Specifically, foam can interfere with readings obtained from sensors in reactors involved in downstream processing of the oil (e.g. preventing an accurate reading of a liquid fill level). The foam can also enter the inlets and outlets of a reactor, or other processing equipment, which can compromise the end product's quality and purity. As such, there is a need to ensure that any foam that is produced in the extraction process dissipates and/or collapses rapidly.

Defoamer compounds can be used to help prevent the build-up of foam and increase the rate of breakdown of foam that has built up. However, existing defoamer compounds are expensive and require high concentrations in order to be effective, further increasing the costs involved (e.g. further purification steps to remove the defoamer may be needed). There is therefore a need for a cheap, easy to produce defoamer that is effective when used in low concentrations.

SUMMARY OF INVENTION

The present inventors have surprisingly found that compounds of formula I have efficacy as defoamers in industrial processes. Compounds of formula I have the advantage that they can be easily and cheaply produced and have efficacy when used at lower concentrations than traditional defoamers.

Thus, the present invention provides the following numbered clauses.

1. A compound of formula I

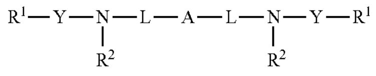

I wherein:

A represents a bivalent polysiloxane moiety having a number average molecular weight of from about 500 to about 10,000 Daltons;

each L independently represents a linear alkylene linker group having from 1 to 10 carbon atoms;

each $R^1$ independently represents a $C_{1-15}$ linear or branched alkyl group;

each $R^2$ independently represents hydrogen or a $C_{1-4}$ alkyl group;

each Y independently represents a covalent bond,

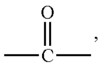

, or

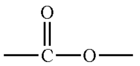

where the carbonyl carbon is bonded to the nitrogen atom.

2. The compound according to Clause 1, wherein A represents a polysiloxane moiety of the following formula:

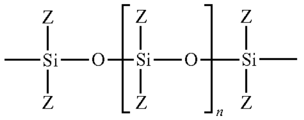

wherein each Z independently represents a $C_{1-5}$ alkyl group.

3. The compound according to Clause 2, wherein each Z independently represents methyl, ethyl, i-propyl or n-propyl, optionally wherein each Z independently represents methyl or ethyl.

4. The compound according to any one of the preceding clauses, wherein the polysiloxane moiety A has a number average molecular weight of from about 1000 to about 5000 Daltons, optionally from about 1500 to about 3500 Daltons, further optionally from about 2000 to about 3000 Daltons.

5. The compound according to any one of the preceding clauses, wherein L represents an alkylene group having from 1 to 5 carbon atoms, optionally from 2 to 4 carbon atoms, such as 3 carbon atoms.

6. The compound according to any one of the preceding clauses, wherein each $R^1$ independently represents a linear or branched $C_{4-10}$ alkyl group, optionally a linear or branched $C_{5-8}$ alkyl group.

7. The compound according to any one of the preceding clauses, wherein each $R^1$ independently represents a linear $C_{4-10}$ alkyl group (e.g. a linear $C_{5-8}$ alkyl group), or a branched $C_{5-8}$ alkyl group.

8. The compound according to any one of the preceding clauses, wherein each $R^1$ is independently selected from one of the group consisting of:

a) a linear $C_5$ alkyl group;

b) a linear $C_6$ alkyl group;

c) a linear $C_8$ alkyl group; and d) a group of formula:

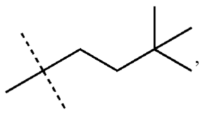

, where the dashed line represents the point of attachment to the rest of the molecule.

9. The compound according to any one of the preceding clauses, wherein:

a) Y is

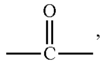

, or

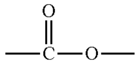

and each $R^1$ is a linear $C_5$ alkyl group;

b) Y is a covalent bond and each $R^1$ is a linear $C_6$ alkyl group;

c) Y is a covalent bond and each $R^1$ is a linear $C_8$ alkyl group;

d) Y is a covalent bond and each $R^1$ is a group of formula:

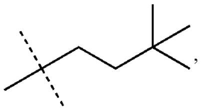

, where the dashed line represents the point of attachment to the rest of the molecule.

10. The compound according to any one of the preceding clauses, wherein each $R^2$ independently represents hydrogen, a methyl group or an ethyl group, optionally wherein $R^2$ represents hydrogen.

11. The compound according to any one of the preceding clauses, wherein:

(a) both L groups are the same; and/or (b) both $R^1$ are the same; and/or (c) both $R^2$ are the same; and/or (d) both Y groups are the same; and/or (e) when present, each Z group is the same optionally wherein both L groups are the same, both $R^1$ are the same, both $R^2$ are the same, both Y groups are the same, and when present, each Z group is the same.

12. The compound according to any one of the preceding clauses, wherein each Y represents a covalent bond or

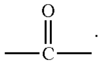

.

13. The compound according to any one of the preceding clauses, which has one of the following structures:

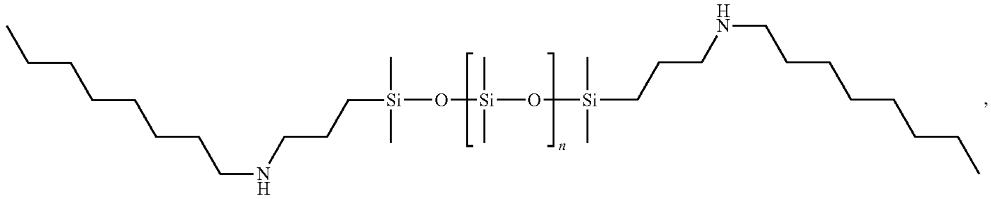

,

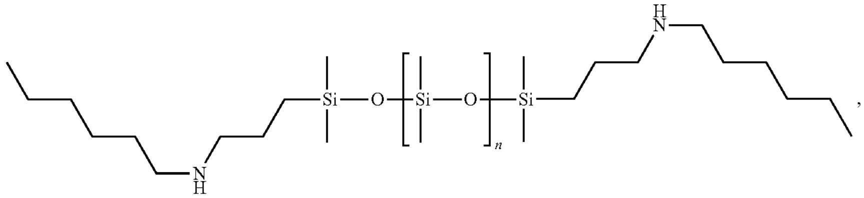

,

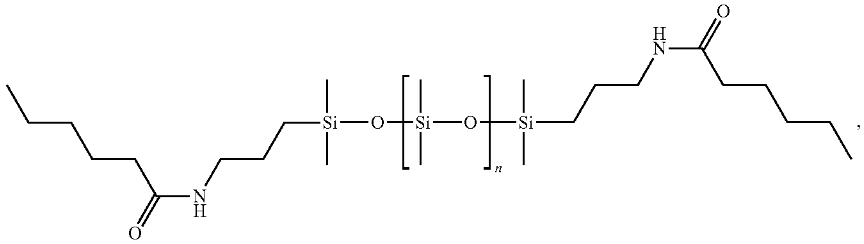

,

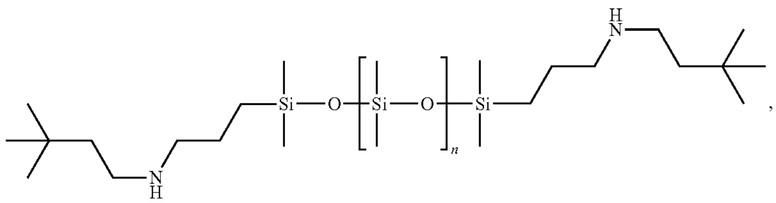

, where the central siloxane polymer moiety has a number average molecular weight of from about 2,250 to about 2,750 Daltons, optionally from about 2,400 to about 2,600 Daltons.

14. Use of a compound as described in any one of Clauses 1 to 13 to prevent or reduce the build-up of foam in a reactor.

15. A method of reducing the build-up of foam in a reactor, said method comprising a step of adding a compound as described in any one of Clauses 1 to 13 to said reactor.

DRAWINGS

Figure 1:
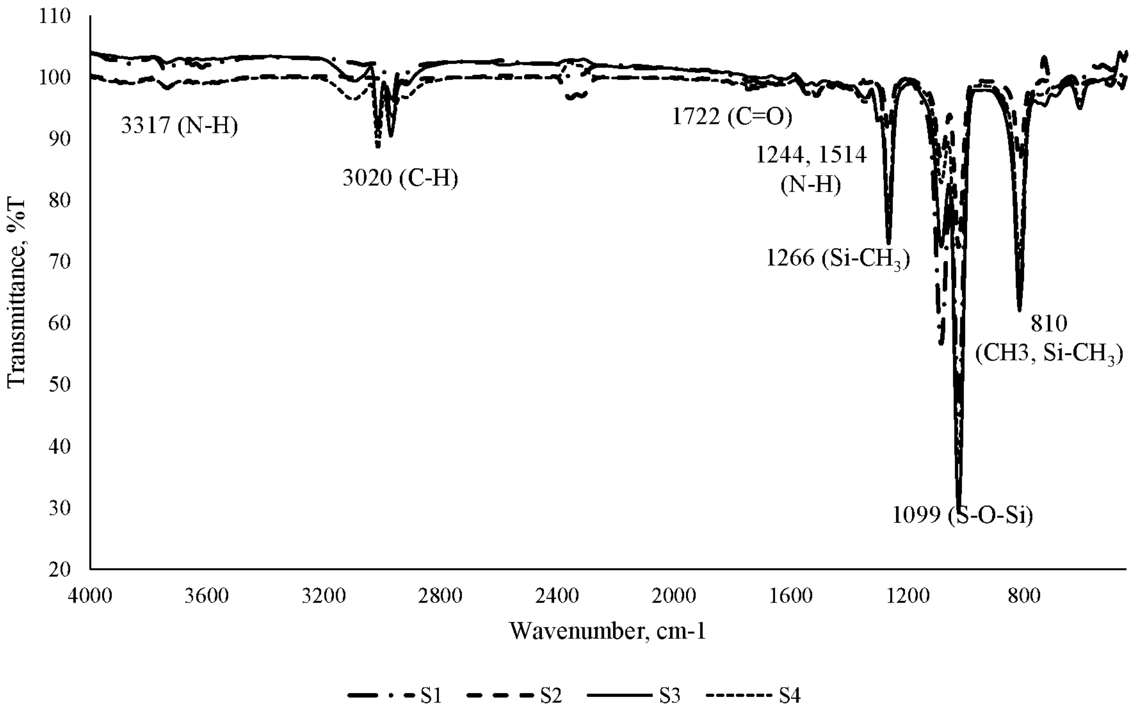
FIG. 1 shows FTIR spectra of four synthesised defoamer compounds S1 to S4.
Figure 2:
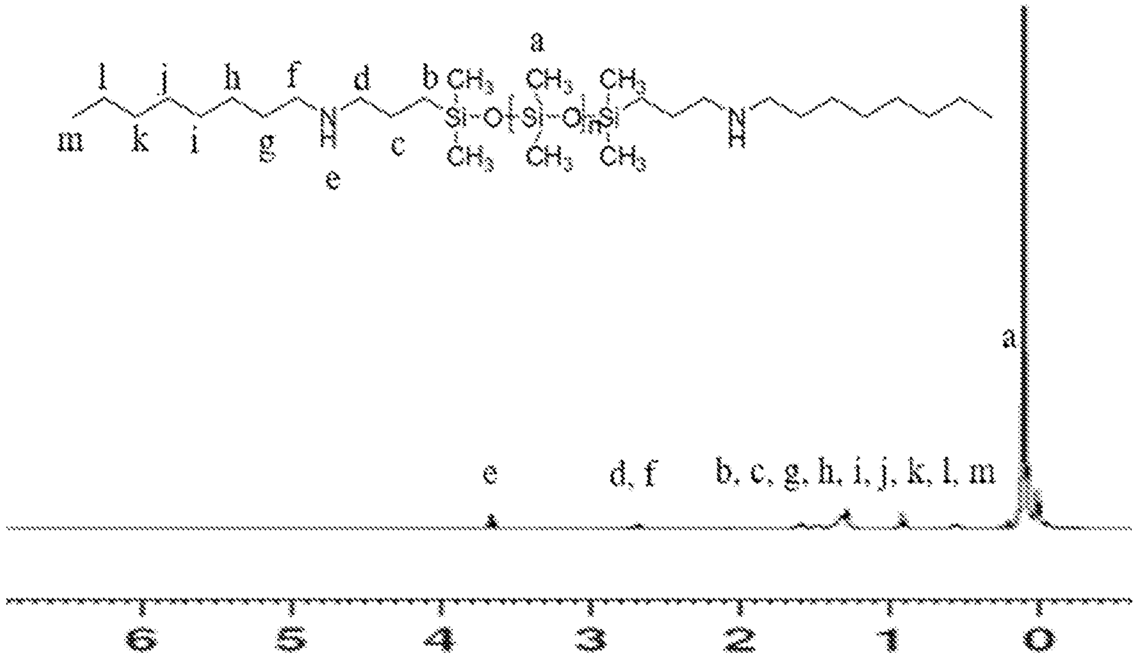
FIGS. 2 to 5 show relevant portions of $^1H$ NMR spectra for defoamer compounds S1 to S4.
Figure 3:
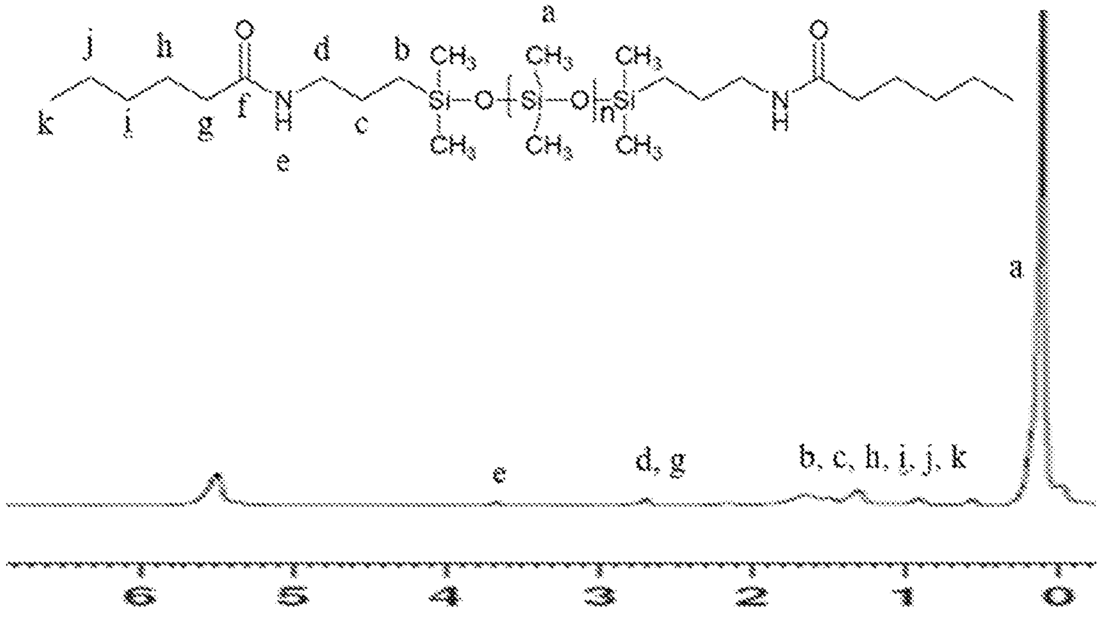
Figure 4:
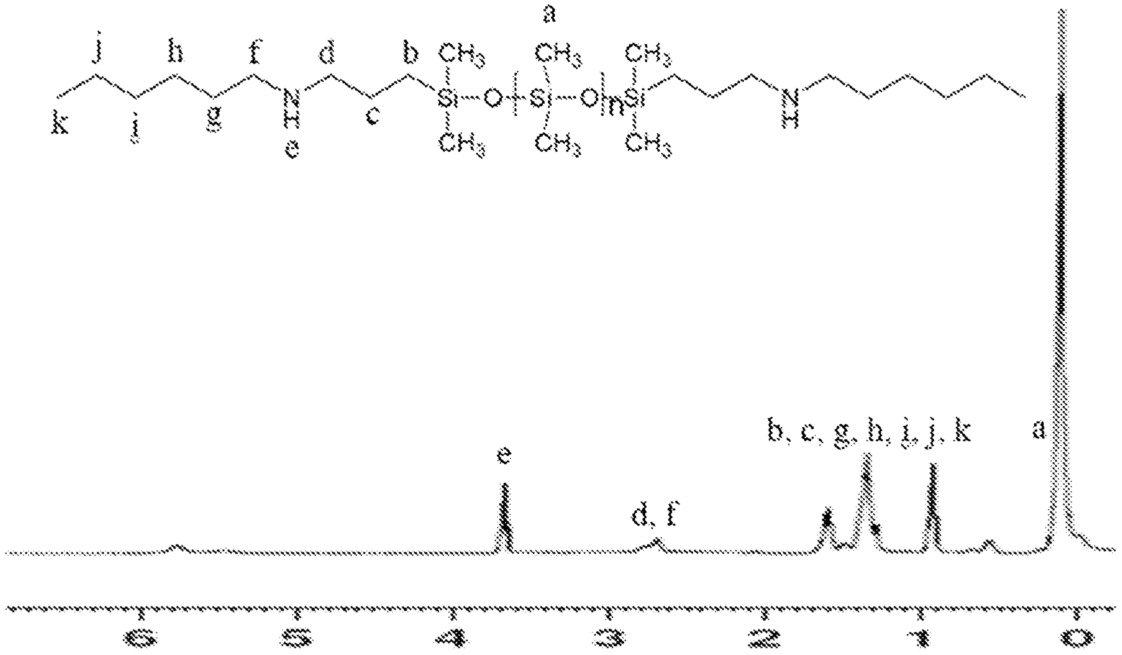
Figure 5:
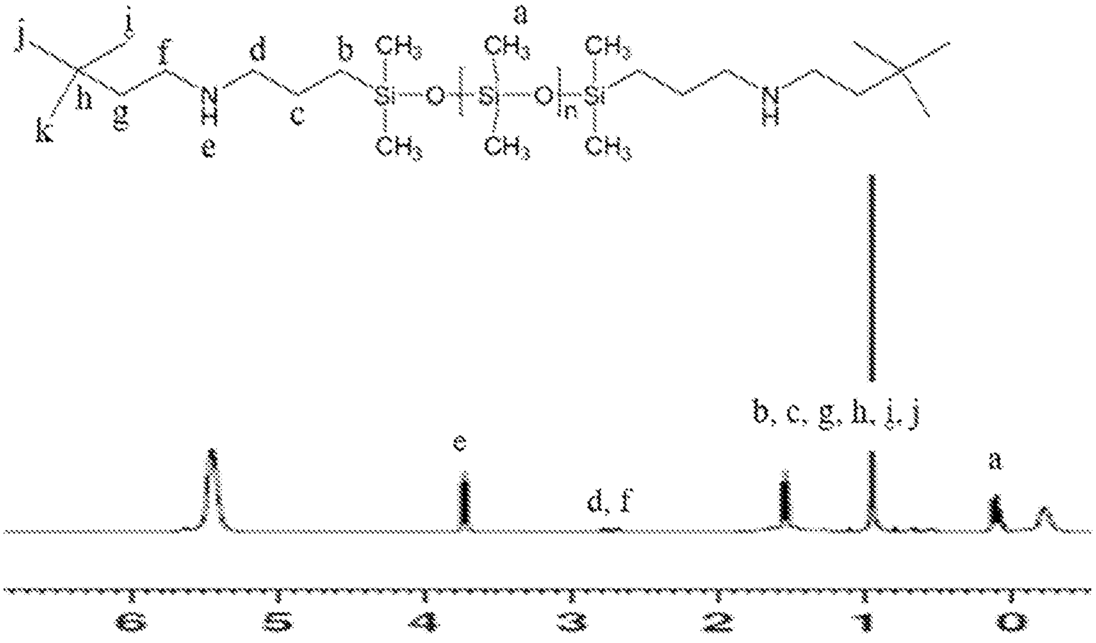
Figure 6:
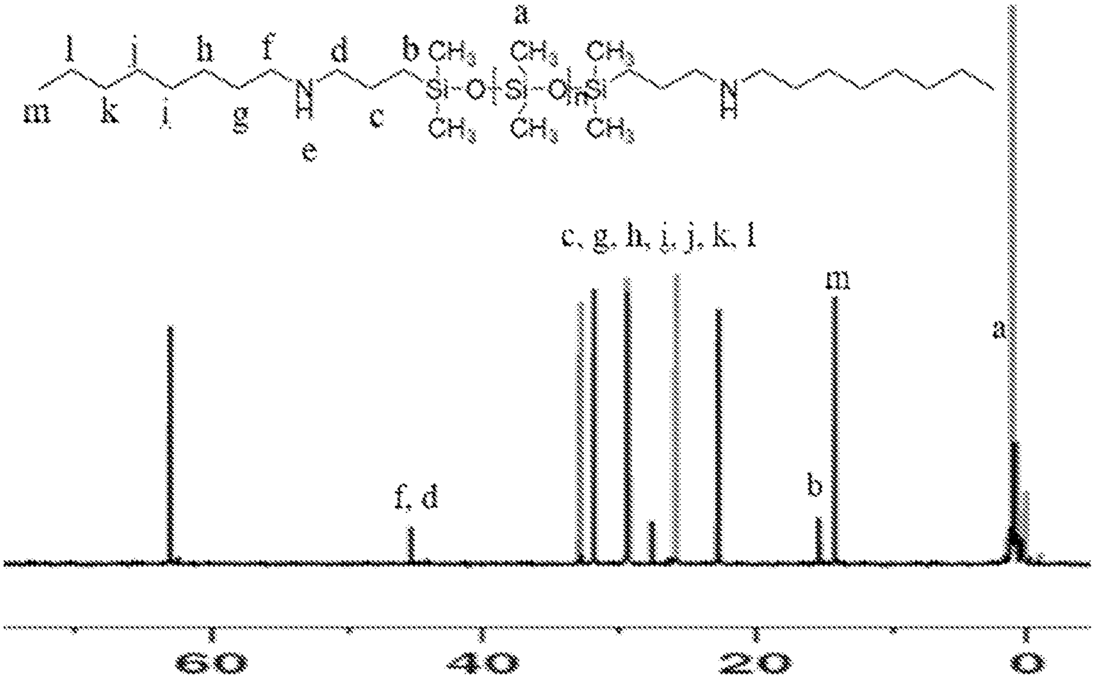
FIGS. 6 to 9 show relevant portions of $^{13}C$ NMR spectra for defoamer compounds S1 to S4.
Figure 7:
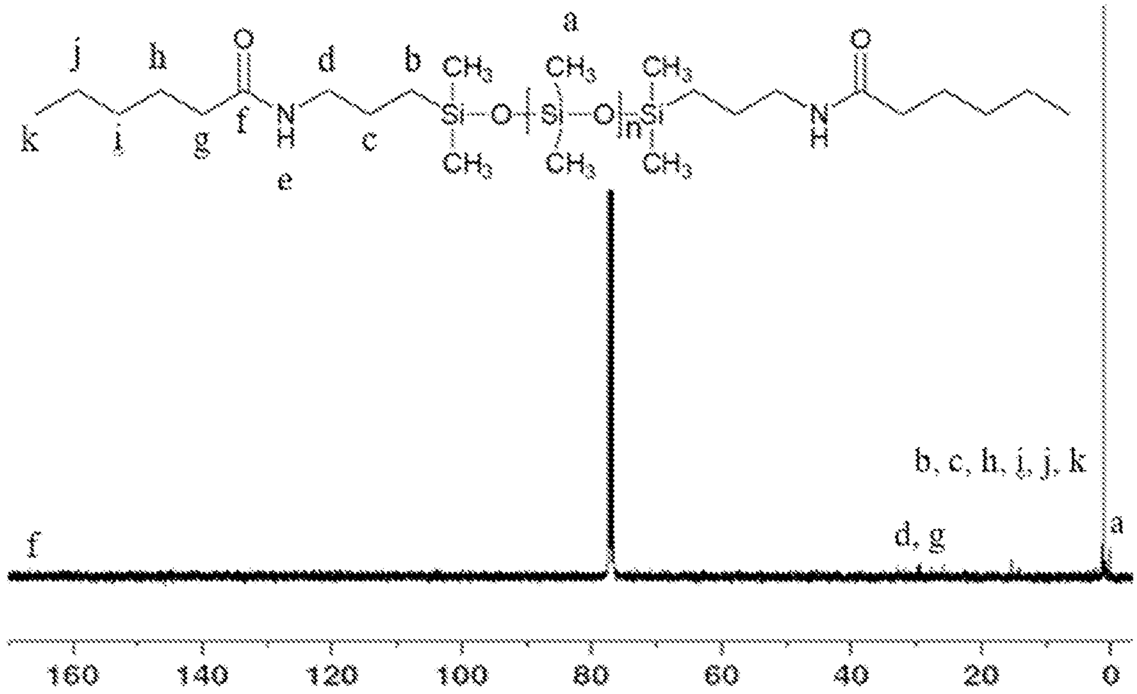
Figure 8:
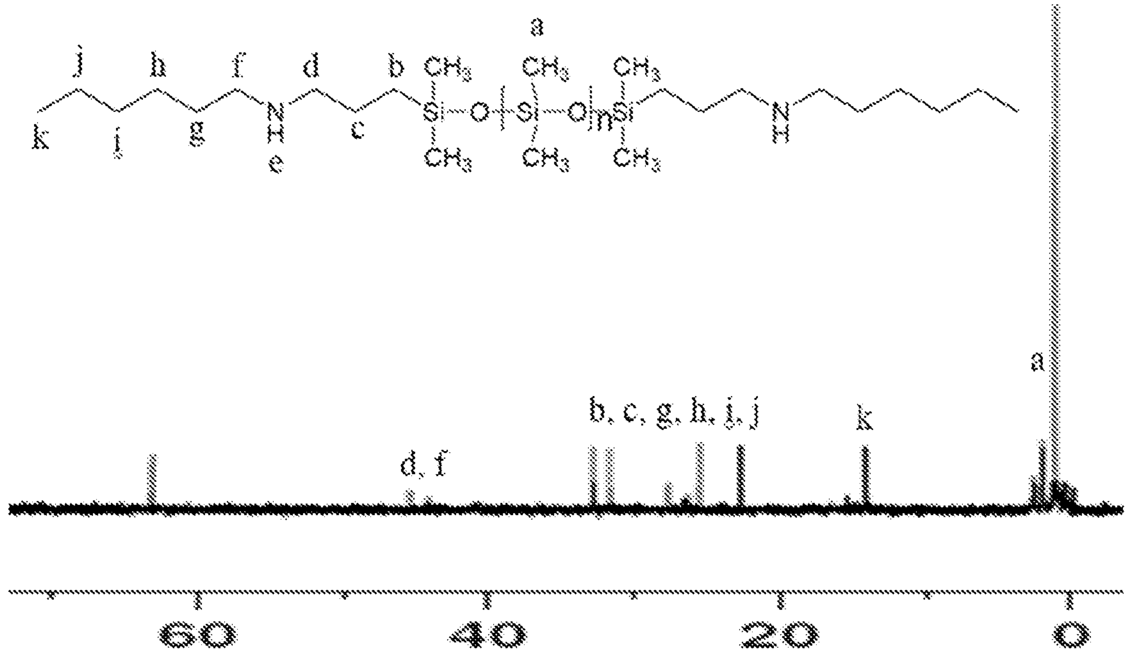
Figure 9:
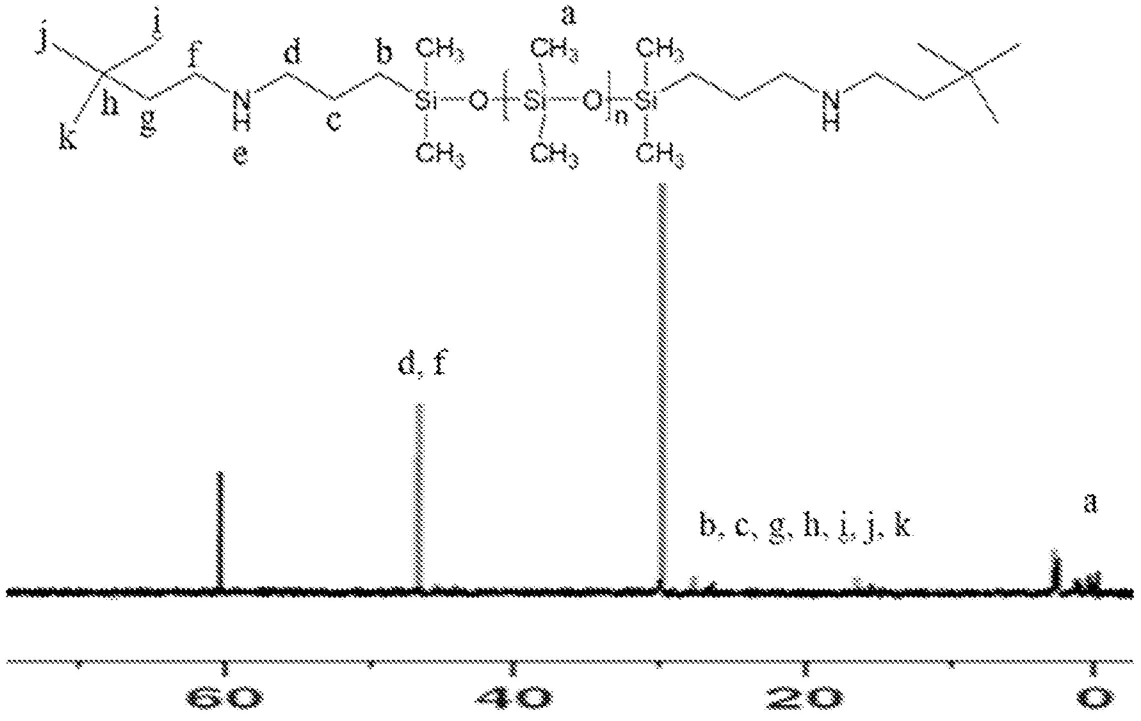

Certain embodiments of the present disclosure are described more fully hereinafter with reference to the accompanying drawings.

DESCRIPTION

The invention provides compounds of formula I that are useful as defoamers.

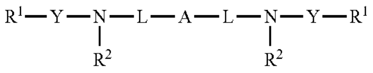

I

A represents a bivalent polysiloxane moiety having a number average molecular weight of from about 500 to about 10,000 Daltons. As used herein, a polysiloxane moiety is a moiety having a —Si—O—Si— backbone with two organic R groups bound to each silicon atom in the backbone. The R groups on each silicon atom may be the same or different, and the R groups on different silicon atoms may be the same or different. In some embodiments of the invention, each silicon atom is substituted by the same two R groups (which may themselves be the same or different), i.e. the polysiloxane may be made from a one monomer rather than a mixture of monomers. In some embodiments of the invention both R groups on each silicon atom are the same, i.e. all R groups in the polysiloxane moiety are the same.

Typically, the silicon atoms in the polysiloxane backbone are substituted with $C_{1-5}$ alkyl groups, i.e. the polysiloxane moiety A has the following formula:

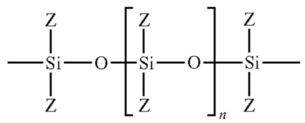

wherein each Z independently represents a $C_{1-5}$ alkyl group and where the polysiloxane moiety has a number average molecular weight of from about 500 to about 10000 Daltons.

When moiety A has the above formula, the compound of formula I has the structure below:

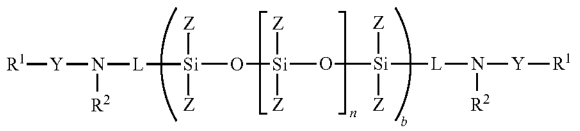

where the central siloxane moiety within parentheses b has a number average molecular weight of from about 500 to about 10000 Daltons.

In some embodiments of the invention, the silicon atoms in the polysiloxane backbone are substituted with methyl, ethyl or n-propyl groups, i.e. each Z independently represents methyl, ethyl, n-propyl or i-propyl.

In some embodiments of the invention, the polysiloxane moiety A has a number average molecular weight of from about 1000 to about 5000 Daltons, for example from about 1500 to about 3500 Daltons, such as from about 2000 to about 3000 Daltons.

Each L independently represents a linear alkylene linker group having from 1 to 10 carbon atoms. In some embodiments of the invention, each L independently represents an alkylene group having from 1 to 5 carbon atoms, for example from 2 to 4 carbon atoms, such as 3 carbon atoms.

Each Y independently represents a covalent bond,

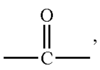

, or

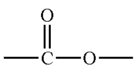

where the carbonyl carbon is bonded to the nitrogen atom in formula I. In some embodiments of the invention, each Y represents a covalent bond or

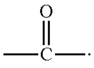

In some embodiments of the invention, each Y represents a covalent bond. In some embodiments of the invention, each Y represents

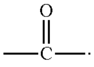

Each $R^1$ independently represents r a $C_{1-15}$ linear or branched alkyl group. In some embodiments of the invention each $R^1$ independently represents a linear or branched $C_{4-10}$ alkyl group, such as a linear or branched $C_{5-8}$ alkyl group. Typically, when $R^1$ represents a branched alkyl group, said branched alkyl group contains fewer carbon atoms to avoid excessive steric hindrance. Thus, in some embodiments of the invention each $R^1$ independently represents a linear $C_{4-10}$ alkyl group or a branched $C_{5-8}$ alkyl group, for example a linear or branched $C_{5-8}$ alkyl group.

Particular $R^1$ groups useful in the invention include a linear $C_5$ alkyl group, a linear $C_6$ alkyl group, a linear $C_8$ alkyl group and a group of formula:

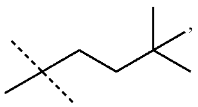

where the dashed line represents the point of attachment to the rest of the molecule.

Typically, when Y is not a covalent bond then $R^1$ represents a linear alkyl group. Thus, specific combinations of Y and $R^1$ useful in the invention include:

a) Y is

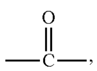 , or 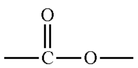

and each $R^1$ is a linear $C_5$ alkyl group;

b) Y is a covalent bond and each $R^1$ is a linear $C_6$ alkyl group;

c) Y is a covalent bond and each $R^1$ is a linear $C_8$ alkyl group; and d) Y is a covalent bond and each $R^1$ is a group of formula

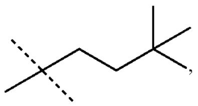

where the dashed line represents the point of attachment to the rest of the molecule.

Each $R^2$ independently represents hydrogen or a $C_{1-4}$ alkyl group. In some embodiments of the invention, each $R^2$ independently represents hydrogen, methyl or ethyl. In particular embodiments of the invention, $R^2$ represents hydrogen.

In embodiments herein, the word “comprising” may be interpreted as requiring the features mentioned, but not limiting the presence of other features. Alternatively, the word “comprising” may also relate to the situation where only the components/features listed are intended to be present (e.g. the word “comprising” may be replaced by the phrases “consists of” or “consists essentially of”). It is explicitly contemplated that both the broader and narrower interpretations can be applied to all aspects and embodiments of the present invention. In other words, the word “comprising” and synonyms thereof may be replaced by the phrase “consisting of” or the phrase “consists essentially of” or synonyms thereof and vice versa.

As used herein, the term “about” when applied to a numerical value means plus or minus 10% from the stated value. As such, a range of from about 1 to about 10 means includes values of from 0.9 to 11.

As used herein, a defoamer is a chemical that is able to reduce the build-up of foam in a reactor and/or facilitate the dissipation/collapse of said foam. Without being bound by theory, defoamers are believed to disrupt the (formation of) foam by entering the gas-liquid interface of the foam. The spreading of the oil defoamer on the gas-liquid interface forms a weak spot on the interface between lamellae, leading to rupture of the film and collapse of the foam.

Compounds of formula I have efficacy as defoamers when present in low concentrations. In some embodiments of the invention, the compounds are able to act as effective defoamers when present in a concentration of as little as 1 ppm. Thus, compounds of formula I may have efficacy as defoamers at a concentration of from about 1 to about 100 ppm, for example from about 2 to about 50 ppm, from about 3 to about 30 ppm, from about 4 to about 20 ppm, such as from about 5 to about 10 ppm.

It is hereby explicitly contemplated that the end point of any range disclosed herein may be combined with the end point of any other range for the same variable. As such, the compounds of formula I may have efficacy as defoamers at any of the following concentrations:

from about 1 to about 100 ppm; from about 1 to about 50 ppm; from about 1 to about 30 ppm; from about 1 to about 20 ppm; from about 1 to about 10 ppm; from about 1 to about 5 ppm; from about 1 to about 4 ppm; from about 1 to about 3 ppm; from about 1 to about 2 ppm;

from about 2 to about 100 ppm; from about 2 to about 50 ppm; from about 2 to about 30 ppm; from about 2 to about 20 ppm; from about 2 to about 10 ppm; from about 2 to about 5 ppm; from about 2 to about 4 ppm; from about 2 to about 3 ppm;

from about 3 to about 100 ppm; from about 3 to about 50 ppm; from about 3 to about 30 ppm; from about 3 to about 20 ppm; from about 3 to about 10 ppm; from about 3 to about 5 ppm; from about 3 to about 4 ppm;

from about 4 to about 100 ppm; from about 4 to about 50 ppm; from about 4 to about 30 ppm; from about 4 to about 20 ppm; from about 4 to about 10 ppm; from about 4 to about 5 ppm;

from about 5 to about 100 ppm; from about 5 to about 50 ppm; from about 5 to about 30 ppm; from about 5 to about 20 ppm; from about 5 to about 10 ppm;

from about 10 to about 100 ppm; from about 10 to about 50 ppm; from about 10 to about 30 ppm; from about 10 to about 20 ppm;

from about 20 to about 100 ppm; from about 20 to about 50 ppm; from about 20 to about 30 ppm;

from about 30 to about 100 ppm; from about 30 to about 50 ppm;

from about 50 to about 100 ppm.

The high defoaming efficacy of compounds of the invention is believed to be in part due to their Gemini surfactant structure, which allows excellent performance at low concentrations, such as 100% collapse of foam within 5 minutes of defoamer addition at a level of about 5 ppm.

In some embodiments of the invention, the compounds of formula I are able to facilitate collapse of up to 100% of produced foam within 10 minutes from defoamer addition, such as within 8 minutes, within 6 minutes or within 5 minutes. This allows for a complete separation of water and oil layers to provide a clear two phase fluid separation without precipitation or formation of an emulsion. The defoamer compounds of the invention provide for rapid and effective foam removal in a reactor. While the defoamers of the invention may facilitate the collapse of 100% of produced foam within 10 minutes or less from defoamer addition, conventional defoamers used in acceptable concentrations (typically 5 to 50 ppm) generally require more than 30 minutes to achieve the same degree of foam collapse.

In some embodiments of the invention, the compounds are symmetrical, i.e. the groups capping the central siloxane polymer moiety are identical. Such compounds can be synthesised more easily than asymmetric compounds, which advantageously reduces manufacturing costs. Thus, in some embodiments of the compound of formula I:

(a) both L groups are the same; and/or
(b) both $R^1$ are the same; and/or
(c) both $R^2$ are the same; and/or
(d) both Y groups are the same; and/or
(e) when present, each Z group is the same In certain embodiments of the compound of formula I: both L groups are the same, both $R^1$ are the same, both $R^2$ are the same, both Y groups are the same, and when present, each Z group is the same.

The invention also provides the use of a defoamer compound of formula I to prevent or reduce the build-up of foam in a reactor, and a method of reducing the build-up of foam in a reactor, comprising a step of adding a defoamer compound of formula I to said reactor. The defoamer may be added to a reactor directly, or it may be first dissolved in an organic (e.g. aromatic) solvent before addition to the reactor.

The below Examples illustrate the invention, and are not to be construed as limitative.

EXAMPLES

Example 1: Synthesis and Characterisation of Defoamer Compounds

Synthesis

Poly(dimethylsiloxane), bis(3-aminopropyl) terminated (PDMS) as the central polymer chain (2 mmol, 5.0 g) and 30% NaOH aqueous solution (0.1 mol, 1.0 g) were mixed together and heated to 70° C. Next, 1-octanol (4.0 mmol, 0.52 g) was added and left to react for 7 hours to produce a $C_8$ alkyl-chain terminated defoamer.

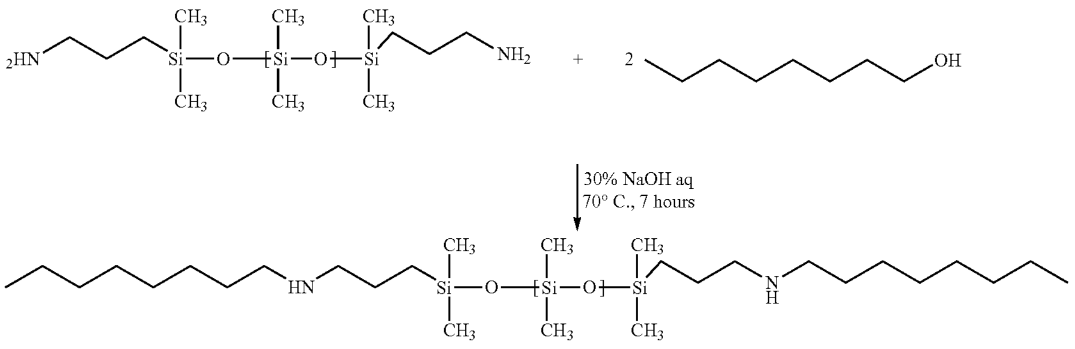

Compound S1: prepared from 1-octanol

In order to prepare a defoamer comprising an amide moiety, DMF (1.0 g) was added into the reaction as a catalyst, and 1-octanol was replaced with hexanoic acid (4.0 mmol, 0.46 g).

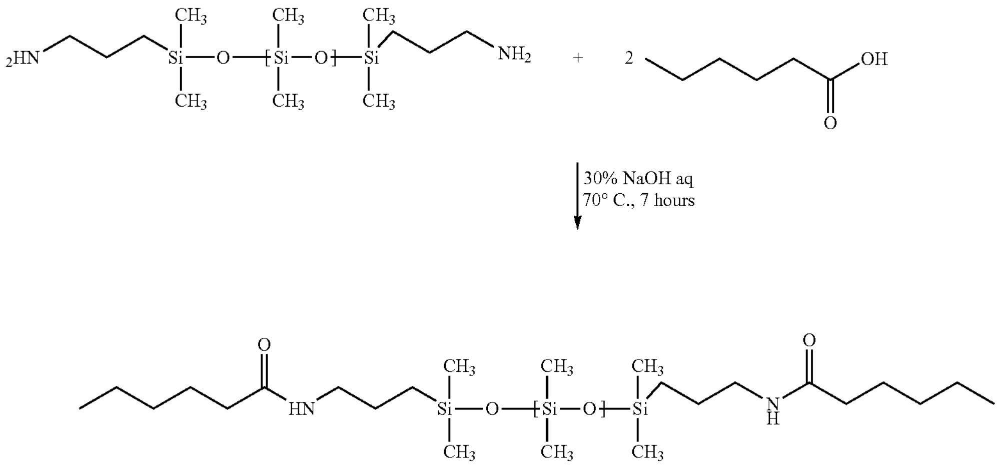

Compound S2: prepared from hexanoic acid

In order to prepare a defoamer comprising a shorter C6 alkyl chain, 1-octanol was replaced with 1-hexanol (4.0 mmol, 0.41 g).

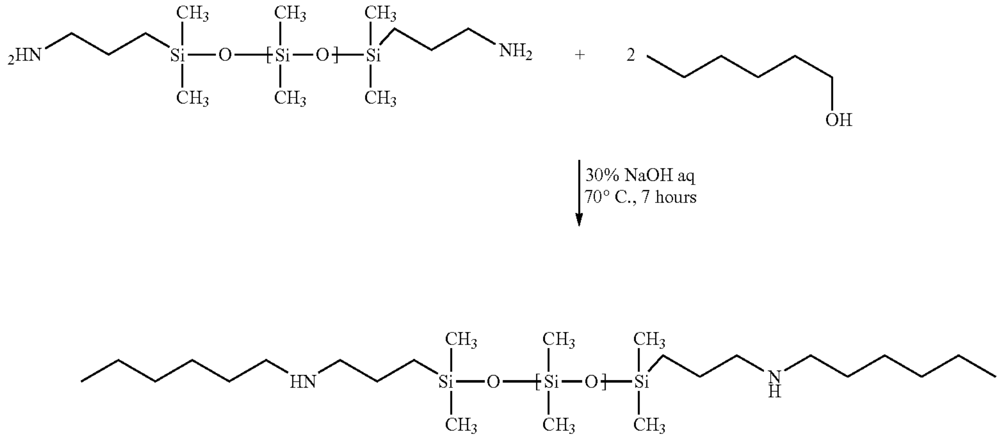

Compound S3: prepared from 1-hexanol

In order to prepare a defoamer comprising a branched chain, 1-octanol was replaced with 3,3-dimethyl-1-butanol (4 mmol, 0.46 g).

suggested the formation of the amide group. The absorption band of C—H for all observed in the range 2698 to 3020 $cm^{-1}$.

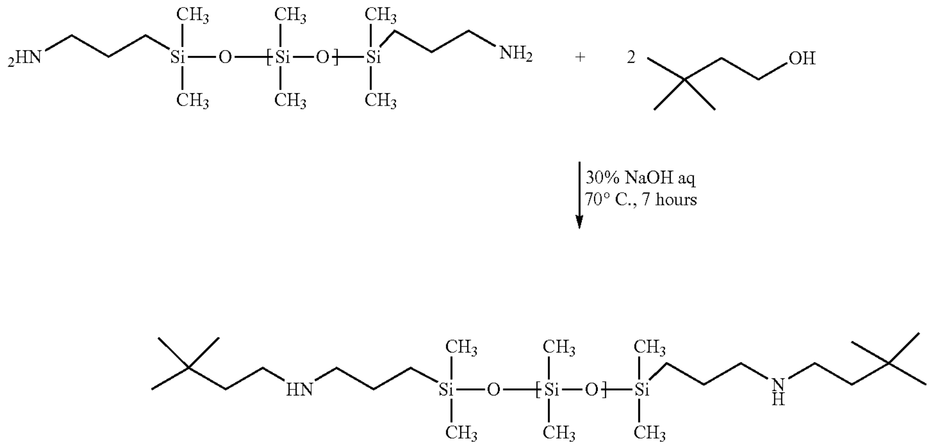

Compound S4: prepared from 3,3-dimethyl-1-butanol

Once the reactions had run to completion, the products were purified using standard techniques.

Characterization

FTIR

FIG. 1 shows superimposed FTIR spectra of the defoamer compounds S1-S4. The IR spectra of Si—O—Si show a high intensity band at 1099 $cm^{-1}$, followed by medium intensity $CH_3$, Si—$CH_3$, and Si—$CH_3$ at 810 $cm^{-1}$ and 1266 $cm^{-1}$, respectively. These bands are attributed to the polysiloxane chains.

The very low intensity secondary amine peak at 3317 $cm^{-1}$, suggests that the reactions ran until almost all of the amine starting material had been used up. The presence of very low amounts of starting material is confirmed by the medium band appearing at 1244 and 1514 $cm^{-1}$, indicating N—H stretching and bending.

The absence of an O—H medium broad band at 3400 to 3650 $cm^{-1}$ strongly suggests that all of the alcohol starting material was used up (for compounds S1, S3 and S4). For compound 2, a weak IR peak was observed at 2966 $cm^{-1}$ that The IR peaks are summarised in Table A below.

TABLE A

FTIR data for the defoamer compounds S1-S4

| IR band ($cm^{-1}$) | | |
| --- | --- | --- |
| Literature data | Data Obtained | Assignment |
| 3500-3300 | 3317 | NH stretch, secondary amide |
| 3020-2698 | 3020-2698 | $Sp^3$-CH stretching vibration of asymmetrical and symmetrical hydrocarbon |
| 1780-1650 | 1722 | C═O stretching vibration of carbonyl |
| 1244, 1568 | 1244, 1514 | NH stretching and bending, secondary amide |
| 1230 | 1266 | Si—$CH_3$ group stretching |
| 1037 | 1099 | Si—O—Si stretching vibration |
| 787 | 810 | CH3 rocking in Si—$CH_3$ group |

NMR

The $^1$H NMR spectra for all defoamers (FIGS. 2 to 5) show two peaks at a chemical shift of 0.2 to 0.8 ppm, which correspond to the dimethyl siloxane repeating units obtained from the parent chain Meanwhile, peaks at a downfield region at a chemical shift of 0.8 to 1.8 ppm were attributed to the proton at the terminal chain of the defoamers. The peaks at a chemical shift of 2.6 to 3.7 ppm corresponded to the —$CH_2$— groups located adjacent to the nitrogen atom. For the amide modified defoamer S2, the peak shifted to the upfield region at a chemical shift of 4.3 ppm due to the de-shielding effect of the nitrogen and oxygen atoms, which neighbour each other.

The $^{13}C$ NMR spectra all defoamers (FIGS. 6 to 9) show peaks at the chemical shift of 0.2 to 0.5 ppm, which represents the carbon atoms of the dimethyl siloxane repeating unit from the parent chain of PDMS. Peaks at the chemical shift of 47 to 63 ppm for the non-amide defoamers S1, S3 and S4 correspond to the carbon of the amine group. However, in the amide defoamer S2, the amine carbon (i.e. the non-carbonyl carbon bonded to the nitrogen atom) was observed around 36 to 40 ppm, due to the different chemical environment caused by the presence of carbonyl group. The carbonyl carbon provided a peak at 178 ppm. The peak shifted to the upfield region due to the de-shielding effect of the nitrogen atom.

Example 2: Testing the Defoamer Compounds

The modified defoamers were tested using the TECLIS Foamscan instrument (TECLIS, France) and KRÜSS dynamic foam analyser DFA100 (KRÜSS GmbH, Germany) to investigate the collapse time, half-life, and stability of foam produced.

Foam Stability (TECLIS Foamscan)

Foam analysis was used to assess the stability of the foams by determining the volume vs. time and the resulting drainage kinetics and liquid volumes in the foams.

Figure 10:
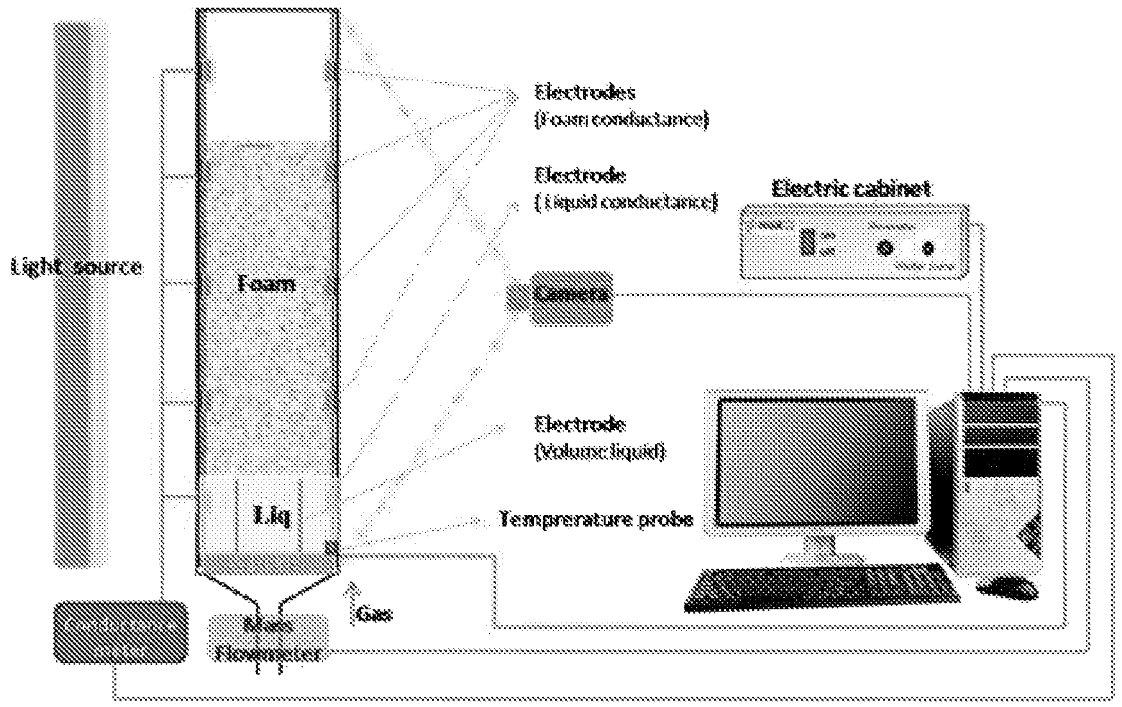
FIG. 10 shows the experimental setup used to analyse foam collapse.

Foam was formed by purging nitrogen gas at a flow rate through a porous glass filter at the bottom of a glass tube containing crude oil and simulated water with an additional of surfactant-foam polymer (SP) reflecting the SP:brine ratios used in a separator The tests were performed at temperatures of 30° C. and 60° C. with an applied pressure at the fixed % water level of 1 bar and 4 bar. The gas flow stopped when the foam volume reached a maximum threshold, and the foam was monitored with a charging-coupled device (CCD) camera to assess changes in both the conductivity of the foam and the optical properties of the foam. The measurement of foam stability was determined by its half-life and collapse time from the original height. The CCD camera and attached conductive electrodes monitored the real-time the height of the column, as shown in FIG. 10.

Defoamer was added by direct injection into the solution, at a concentration of from 10 ppm to 50 ppm.

Figure 12:
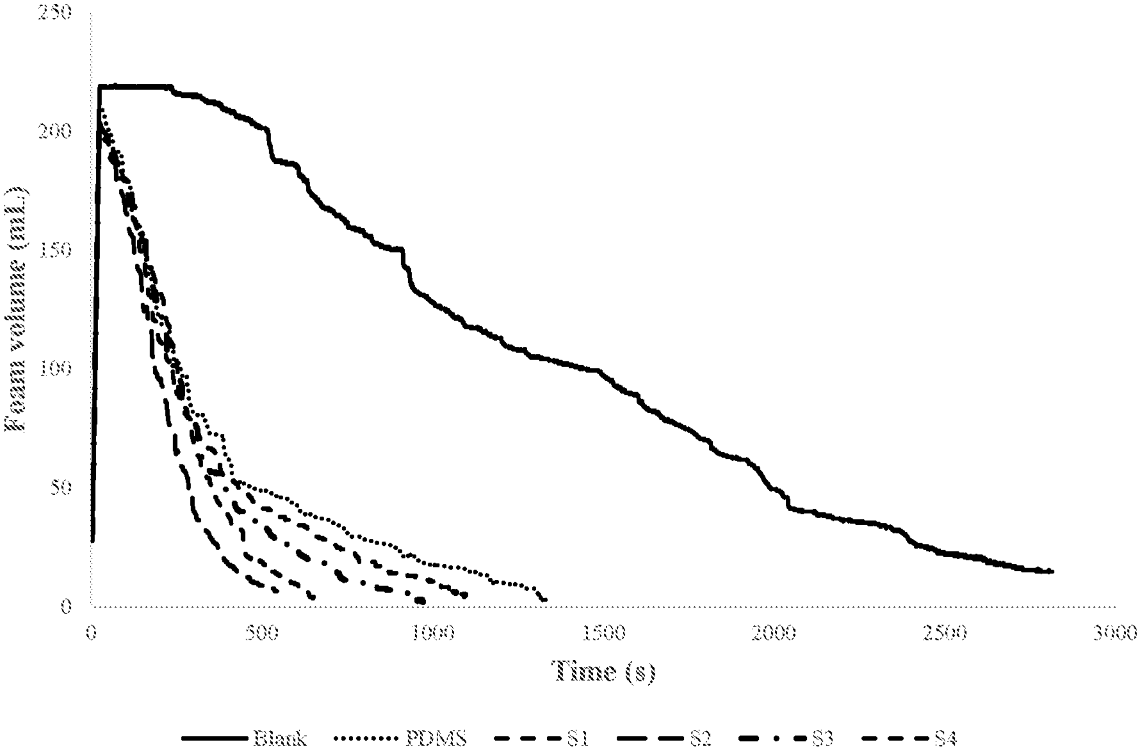
FIG. 12 shows foam collapse over time for the defoamer compounds S1 to S4 and a control.
Figure 13:
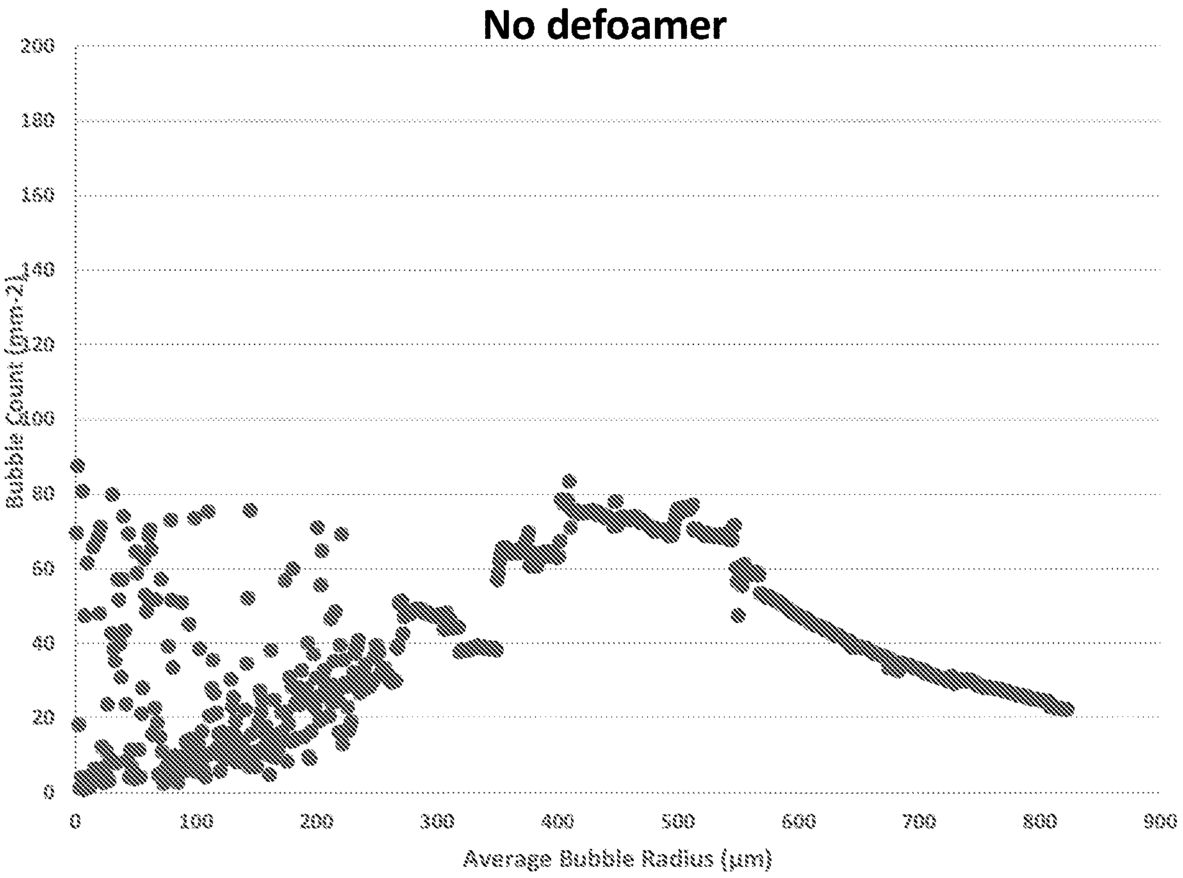
FIGS. 13 to 17 show foam bubble size distribution for experiments using a control, and defoamer compounds S1 to S4.
Figure 14:
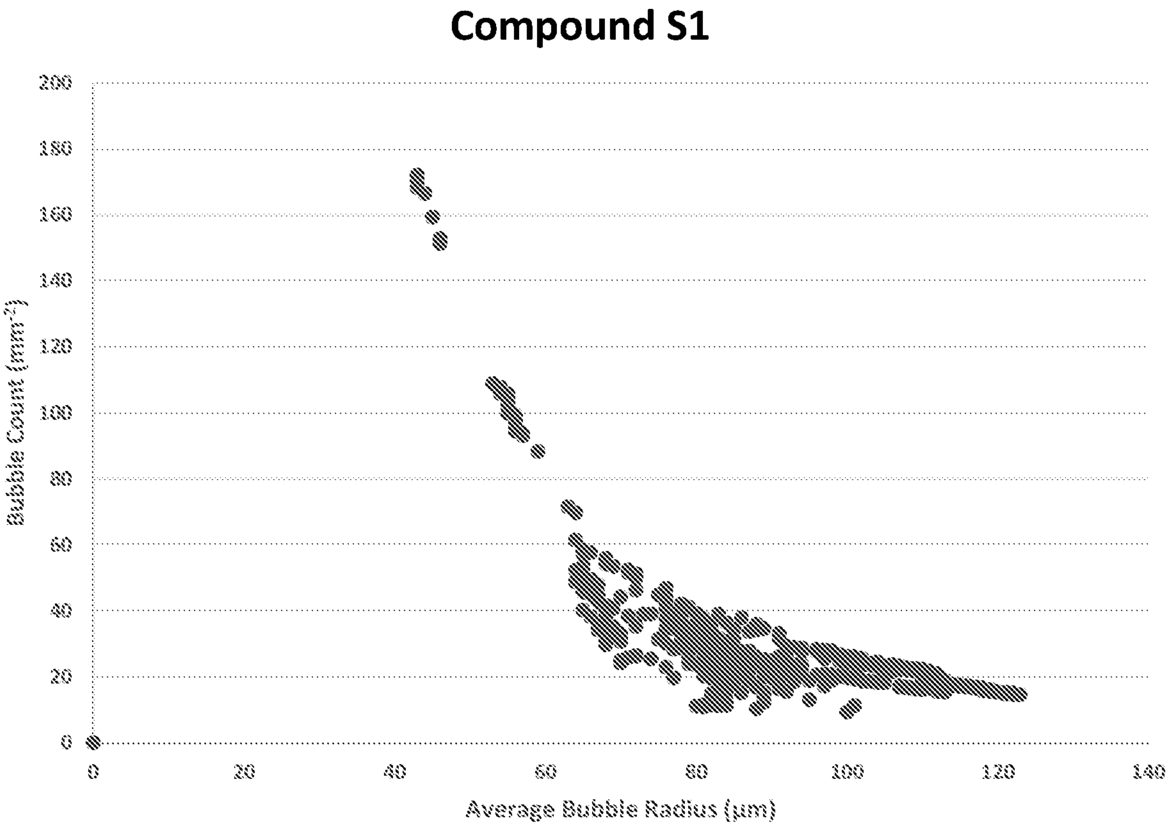
Figure 15:
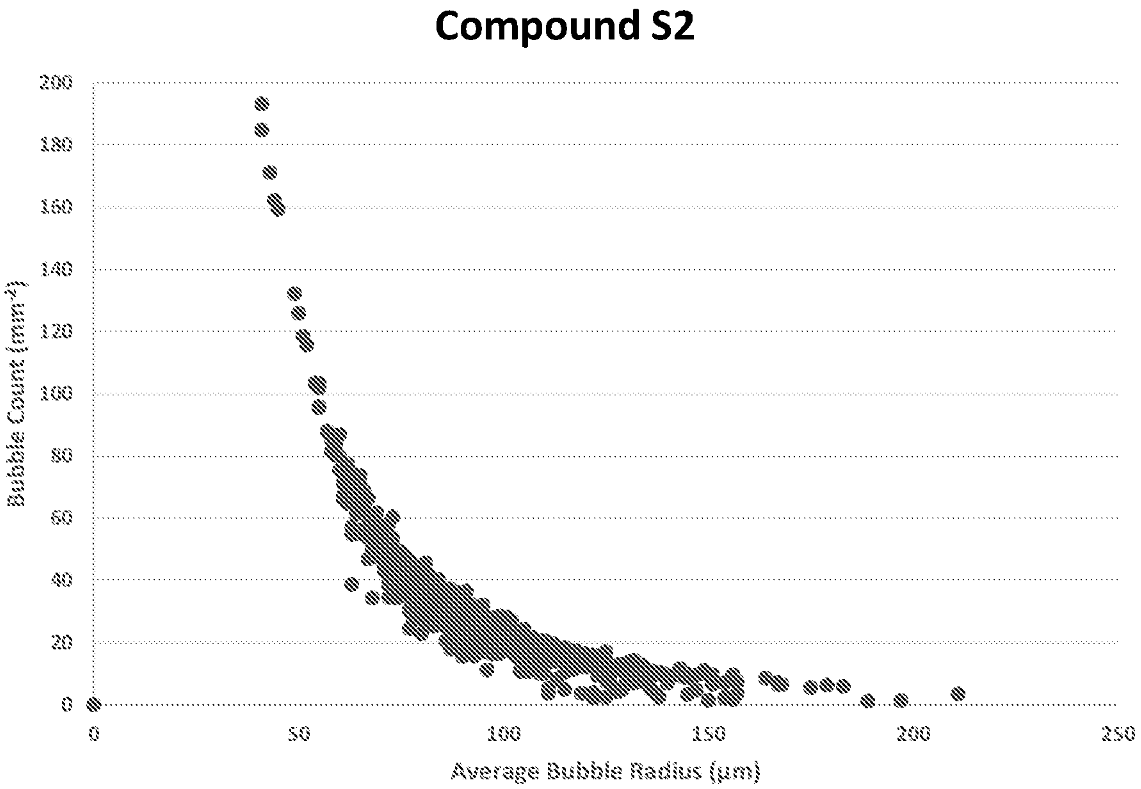
Figure 16:
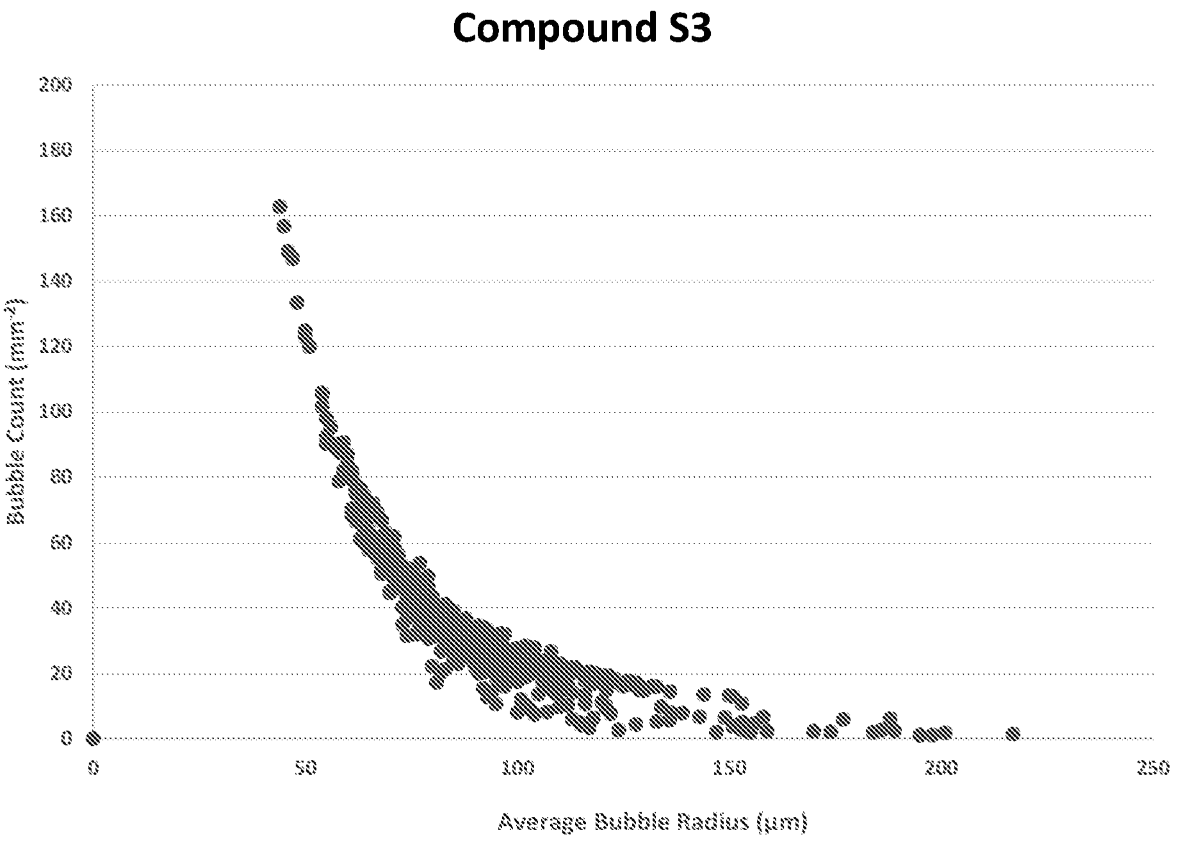
Figure 17:
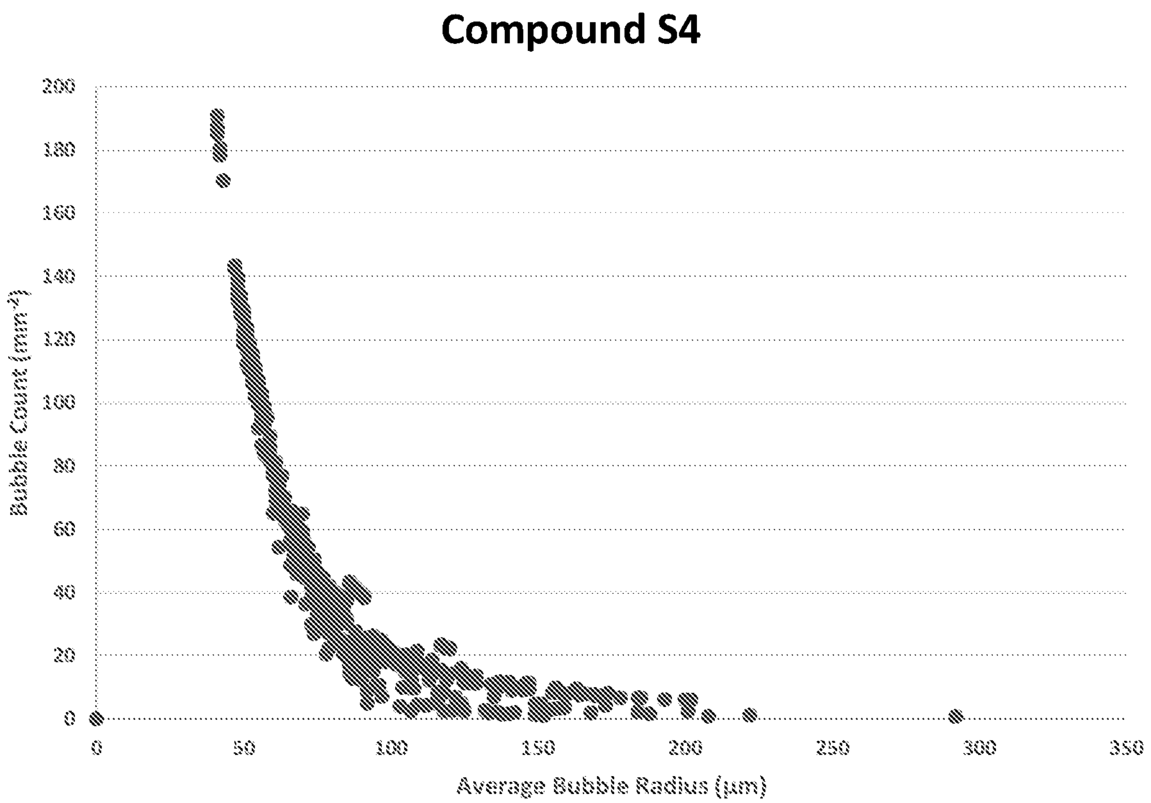

FIG. 12 shows the foam volume against time after defoamer addition for experiments using the defoamers S1 to S4. A control experiment using no defoamer was also performed, along with a comparative example using the known defoamer polydimethylsiloxane bis(3-aminopropyl) (PDMS). It is clear that the defoamers of the invention provide an improved foam collapse compared to PDMS.

The effect of varying the temperature and pressure is shown in Tables B to D below.

TABLE B

The detailed data of Dynamic Foam Analyzer in 30° C. at 1 bar
Effect of Temperature

| Product | Time of foam (s)<br>Max time of gas purging ($t_{max}$) | Min foam height after foam breakage ($t_{min}$) | Half-Life ($t_{1/2}$) | Collapse time ($t_{min}$) − ($t_{max}$) |
|---|---|---|---|---|
| Blank | 47.25 | 341.75 | 147.25 | 294.50 |
| Parent Chain - Poly(dimethylsiloxane) bis (3-aminopropyl) terminated | 120.40 | 136.90 | 8.25 | 16.50 |
| S 1 | 120.39 | 203.89 | 41.75 | 83.50 |
| S 2 | 120.45 | 184.95 | 32.25 | 64.50 |
| S 3 | 116.20 | 211.70 | 47.75 | 95.5 |
| S 4 | 97.09 | 175.09 | 39.00 | 78.00 |

TABLE C

The detailed data of Dynamic Foam Analyzer at 60° C. at 1 bar

| Product | Time of foam (s)<br>Max time of gas purging ($t_{max}$) | Min foam height after foam breakage ($t_{min}$) | Half-Life ($t_{1/2}$) | Collapse time ($t_{min}$) − ($t_{max}$) |
|---|---|---|---|---|
| Blank | 26.78 | 120.28 | 46.75 | 93.50 |
| Parent Chain - Poly(dimethylsiloxane) bis (3-aminopropyl) terminated | 63.27 | 125.67 | 31.20 | 62.40 |
| S 1 | 36.85 | 83.35 | 23.25 | 46.50 |
| S 2 | 120.47 | 144.97 | 12.25 | 24.50 |
| S 3 | 30.40 | 103.64 | 36.62 | 73.24 |
| S 4 | 41.47 | 87.97 | 23.25 | 46.50 |

TABLE D

Time taken for foam to collapse at two different pressure at 60° C.
Effect of Pressure

| Sample | Collapse time of foam (s)<br>1 Bar | 4 Bar |
|---|---|---|
| Blank | 93 | 2778 |
| Poly(dimetylsiloxane), bis (3-aminopropyl) terminated | 62 | 2275 |
| S 1 | 46 | 638 |
| S 2 | 24 | 510 |
| S 3 | 73 | 975 |
| S 4 | 46 | 1075 |

Foam Bubble Size Distribution (KRÜSS Dynamic Foam Analyser DFA100)

Figure 11:
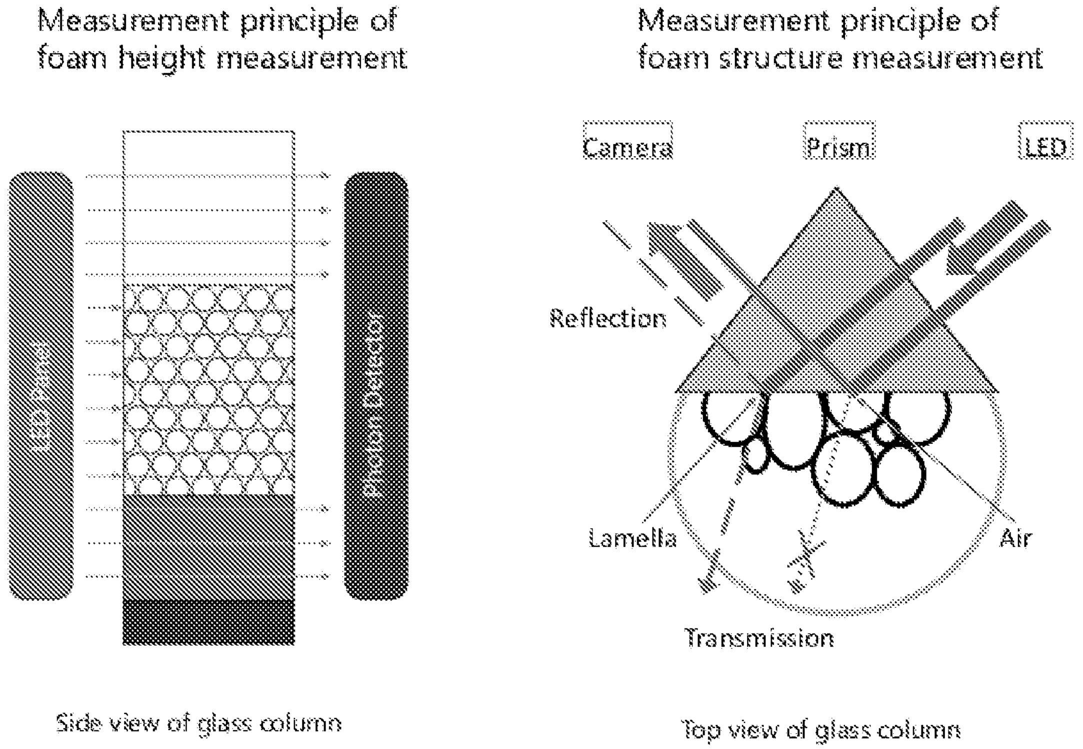
FIG. 11 shows the underlying principles behind foam height and structure measurement.

Dynamic Foam Analyzer DFA100 from KRUSS, Germany is an experiment where the total height and foam structure are simultaneously calculated, and the foam structure evaluated for bubble size and distribution (FIG. 11). Compressed air is passed through a sintered glass frit at the bottom of a 40 mm inner diameter cylindrical glass vessel containing samples to generate foam. The glass frit diameter and thickness were 44 and 4 mm, respectively. This frit's pores had a diameter of 16-40 μm. The gas flow was set to 0.5 L/min and was stopped after 6 minutes of foaming. The total sample size was 40 ml which consisted of crude oil, simulated produced water and surfactant-foam polymer (SP) representing the SP:brine ratio in a separator. The tests were conducted at temperatures of 30° C. and 60° C. with an applied pressure of 1 bar at the fixed % water level.

The sample temperature remained constant until the foam collapsed. Bubble count, foam size distributions, and the thicknesses of the liquid layers between the bubbles were obtained. The foam and liquid heights were determined using an LED panel and photon detectors at the front and back of the column respectively and continuously monitored by calculating light transmission through the glass column Total foam height was 200 mm (about 250 mL) in all measurements. A lens with a scanning region of 10.5×7.5 mm was located 55 mm above the glass fritting for the bubble size distribution measurement. Based on the principle of total reflection, a prism enabling 2D structural analysis of bubbles was placed along the light path. Glass and liquid have comparable refractive indices, thus partially diffracting and transmitting the light incident on the foam lamella. In contrast, glass and air have a different refractive index, and this results in reflection of light hitting the gas bubbles.

Defoamer was added by direct injection into the solution, at a concentration of from 10 ppm to 50 ppm.

The foam bubble size distribution at 7 minutes after defoamer addition is shown in FIGS. 13 to 17.

It is clear from the results in FIGS. 12 to 17 that the defoamer compounds of the invention provide a rapid foam collapse, readily reducing the number of bubbles present in a foam.

What is claimed is:

1. A compound selected from one of the following structures:

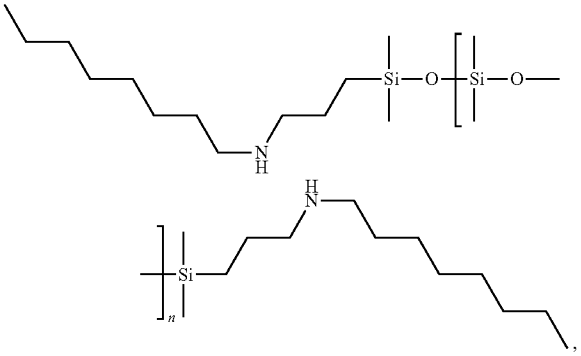

-continued

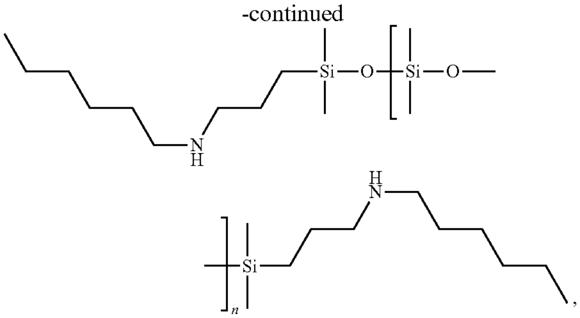

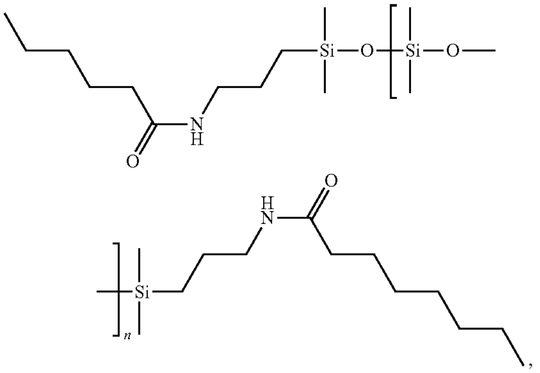

and

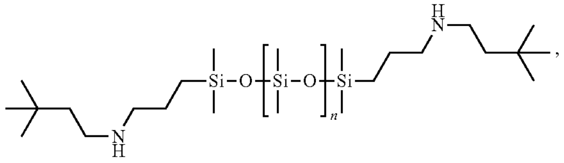

wherein the central siloxane polymer moiety

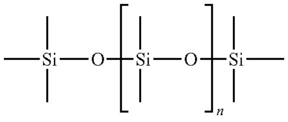

has a number average molecular weight of from 2,250 Daltons to 2,750 Daltons.

2. A method of reducing build-up of foam in a reactor, wherein the method comprises a step of adding the compound of claim 1 to the reactor.

3. The compound according to claim 1, wherein the compound has the structure:

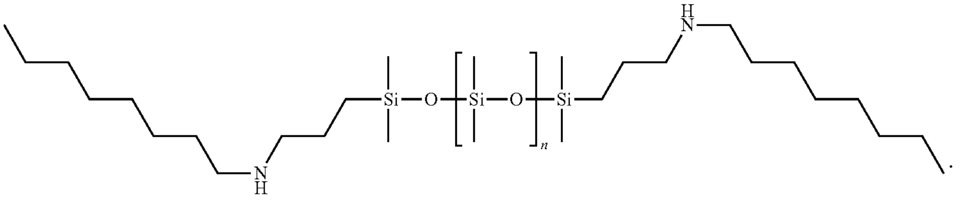

4. The compound according to claim 1, wherein the compound has the structure:

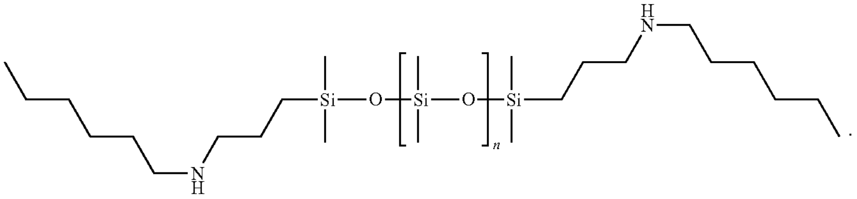

5. The compound according to claim 1, wherein the compound has the structure:

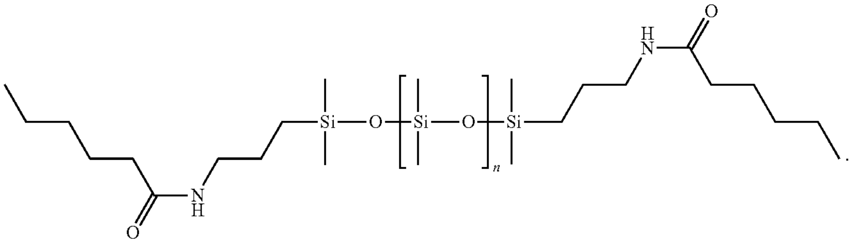

6. The compound according to claim 1, wherein the compound has the structure:

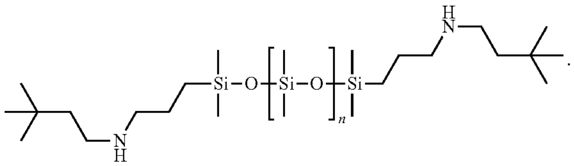

7. The method of claim 2, wherein the reactor comprises:
crude oil;
water; and
a surfactant.

8. The method of claim 2, where the step of adding the compound to the reactor comprises adding the compound in an amount from 10 ppm to 50 ppm.

9. A composition comprising:
crude oil;
water;
a surfactant; and
from 10 ppm to 50 ppm of the compound of claim 1.

10. The composition of claim 9, wherein the temperature of the composition is from 30° C. to 80° C. at an applied pressure of from 1 bar to 4 bar.

* * * * *